Patented Aug. 29, 1950

2,520,312

UNITED STATES PATENT OFFICE 2,520,312

SYNTHESIS OF AMINO ACIDS

William F. Gresham and Carl E. Schweitzer, Wilmington, Del., assignors to E. I. du Pont de Nemours & Company, Wilmington, Del., a corporation of Delaware No Drawing. Original application January 25, 1945, Serial No. 574,626. Divided and this application January 30, 1948, Serial No. 5,512

1 Claim. (Cl. 260—534)

This invention relates to the preparation of alpha-monoamino carboxylic acids. More particularly it relates to improvements in the preparation of alpha-monoamino nitriles and hydrolysis thereof to alpha-monoamino acids. This application is a division of our application S. N. 574,626, filed January 25, 1945, now abandoned, which in turn, is a continuation-in-part of our copending application Ser. No. 522,966, filed September 18, 1944, now abandoned, wherein it is disclosed that alpha-hydroxy-gamma-methyl-mercaptobutyronitrile upon treatment with ammonia at a temperature of about 10° to 150° C. under superatmospheric pressure is converted in high yield to alpha-amino-gamma-methylmercaptobutyronitrile, which on hydrolysis in an aqueous acid medium, gives methionine in high yield. It is also disclosed in application Ser. No. 522,966 that the aqueous acidic hydrolyzing agent may contain small amounts of mercury, copper, or zinc salts.

It has been known for some years that hydroxyacetonitrile may be treated with ammonia at low temperature to produe aminoacetonitrile, (British Patent 436,692). It has also been known that aminoacetonitrile can be hydrolyzed to aminoacetic acid by treatment with sulfuric acid. However, in the synthesis of amino acids by the best heretofore available methods for preparing and hydrolyzing aminonitriles, very low yields (about 6% to 35%) generally were obtained (Organic Syntheses, Collective Volume II, Blatt, John Wiley and Sons, Inc., 1943, pages 29–31, 386). The present invention, in contrast with the prior art, provides a succession of inter-related steps whereby very high yields of alpha-monoamino acids are obtained. The improvements in each step are such as to provide intermediate products uniquely suitable for use in each succeeding step, and it is a result of the combination of steps, as well as the inventive improvements in each step, that remarkably high yields are obtained.

An object of this invention is to provide a commercially feasible process for the preparation of alpha-mono-amino-carboxylic acids. A further object of the invention is to improve the available methods for preparation and hydrolysis of alpha-aminonitriles so as to produce high yields of the amino acids.

These and other objects of the invention are accomplished by preparing alpha-aminonitriles, generally from the corresponding alpha-hydroxynitriles by treatment with an excess of ammonia (usually about 10 to 50 mols per mol of hydroxynitrile) at a temperature of about 50° C. to 150° C., preferably 60° to 130° C., under a pressure of at least 5 atmospheres, but much more efficiently at a pressure of about 25 to 1000 atmospheres, and thereafter hydrolyzing the resulting aminonitrile in an aqueous medium containing an alkaline-reacting or an acid-reacting hydrolytic agent. In a specific embodiment the hydrolysis is conducted in the presence of aqueous sulfuric acid containing a dissolved promoter, such as a salt of a heavy metal. For rapid hydrolysis, elevated temperatures of about 75° to 125° C., may be employed. The hydrolysis may be conducted in an apparatus equipped with a reflux condenser or, alternatively, in a suitable autoclave when the hydrolysis is to be conducted under pressure. The promoters which are found to be most useful, according to this invention, for the hydrolysis of alpha-aminonitriles to alpha-amino-acids are the salts of group I-b heavy metals, and the salts of heavy metals having atomic numbers adjacent to the heavy metals of group I-b. These metals are copper, silver, cobalt, zinc, cadmium, mercury, nickel, palladium, and platinum. Of these, one of the outstanding members is mercury. It is to be understood that soluble salts of these metals need not be introduced as such into the reaction mixture, but that the oxides, carbonates, etc. may be employed, since they are converted to soluble salts under the hydrolysis conditions. The amount of heavy metal salt promoter required, according to the invention, is generally not more than about 5% based on the total weight of reaction mixture, the preferred quantity being about 0.05 to 2.0%. In another embodiment, the hydrolysis of the aforesaid aminonitrile is conducted in the aforesaid manner in an acidic or alkaline medium, and amino acid is extracted from the final crude reaction product by means of liquid ammonia.

Any of the common inorganic acids may be used as a hydrolytic agent in the practice of this invention, sulfuric acid or hydrochloric acid being preferred. When a promoter is employed, the preferred acid is sulfuric acid. While an excess of the acid may be employed, it is unnecessary, in the presence of the aforesaid promoters, to use a large excess of the acid. If desired, the amount of acid used may be from about 0.2 to about 10.0 equivalents per mol of aminonitrile charged, although preferably at least 1.0 equivalent of acid is employed per mol of aminonitrile. The optimum concentration of the acid depends on the nature of the acid employed. For example, excellent results are obtained with aqueous sulfuric acid containing about 30% to 50% by weight of $H_2SO_4$, when a promoter is used. In some instances, if the concentration of promoter is relatively low (about 0.1%), the optimum concentration and quantity of acid is higher than when larger concentrations of promoter are employed.

The promoters for the sulfuric acid hydrolytic agent are neither necessary nor markedly advantageous in all instances, but such promoters are especially valuable and effective in the preparation of aminoacetic acid, dl-valine and similar alpha-mono-aminocarboxylic acids.

The alpha-mono-aminocarboxylic acids which may be prepared, in accordance with this invention, from the corresponding alphahydroxynitriles include aminoacetic acid, dl-leucine, dl-alanine, dl-aspartic acid, dl-glutamic acid and the like. The alpha-mono-aminocarboxylic acids which may be prepared most satisfactorily, in accordance with this invention, are those alpha-aminocarboxylic acids which contain (in addition to the amino and carboxyl groups) only hydrocarbon groups, or hydrogen, attached to the alpha-carbon atom. In certain instances, the promoters may react with the aminonitrile to form insoluble by products. Thus, in the preparation of methionine and cysteine in the presence of heavy metal salt promoters, difficulty is encountered due to the formation of insoluble sulfides. This difficulty does not arise in the corresponding preparation of alpha-amino acids having only an alkyl or aralkyl group substituted on the alpha carbon atom.

The invention is illustrated further by means of the following examples.

Example 1.—Into a one-gallon stainless steel autoclave containing 300 grams of formaldehyde cyanhydrin is injected 1400 grams of ammonia, the injection requiring 10 seconds. The mixture is maintaned at a temperature of 80° C. for 15 minutes under a maximum pressure of 35 atmospheres. Thereafter the product is withdrawn, and the excess ammonia is removed therefrom by evaporation. The resulting residue contains 255 grams of aminoacetonitrile. A 14 gram portion of aminoacetonitrile prepared by this method is hydrolyzed by boiling for one hour with 28.8 grams of 95% sulfuric acid in 100 c. c. of water, to which 0.3 gram of mercuric oxide promoter has been added. The aqueous hydrolyzate is then cooled, and brought to a pH of 8 by addition of 35 c. c. of concentrated aqueous ammonia. The resulting mixture is evaporated to dryness at a temperature of 110° C., which yields an anhydrous solid residue. This residue, upon being pulverized and extracted with 500 c. c. of anhydrous ammonia, gives an extract which on evaporation yields 15.6 grams of aminoacetic acid (83.2% conversion).

Example 2.—The crude aminoacetonitrile prepared in accordance with the preceding example is distilled, yielding aminoacetonitrile having a boiling point of 66° at 10 mm. (80% conversion). To determine the effect of the mercuric compound as a promoter on the hydrolysis of the distilled aminoacetonitrile, two experiments are made, as follows:

(a) A mixture containing 51 grams conc. sulfuric acid and 100 grams of water is heated to boiling, and a mixture of 14 grams of aminoacetonitrile (B. P. 66°, 10 mm.) and 14 grams of water is slowly introduced. The resulting mixture is heated at boiling temperature with stirring for a total reaction time of 5 hours. The product is then neutralized with ammonium hydroxide to a pH of about 8, and the solvent is removed at reduced pressure. The resulting dark brown solid product is dried at 110° C. It is extracted with liquid ammonia and the ammonia is evaporated yielding 10.1 grams of crude aminoacetic acid (conversion 54%).

(b) A mixture containing 38 grams of conc. sulfuric acid, 77 grams of water, and 0.15 gram mercuric oxide is heated to boiling, and a solution of mercuric sulfate (about 0.1° by weight) is thus obtained. During a period of 0.25 hour a mixture of 14 grams of aminoacetonitrile (B. P. 66°, 10 mm.) and 15 grams of water is added. The resulting reaction mixture is heated with stirring at boiling temperature, under reflux, for an additional 0.25 hour making the total reaction time 0.5 hour. The product is then withdrawn and is neutralized with ammonium hydroxide to a pH of about 8. The solvent is then removed at a reduced pressure, leaving a light yellow, solid residue. This is dried at 110° C., and extracted with liquid ammonia. Upon evaporation of ammonia from the extract there remains 17.7 grams of aminoacetic acid, which corresponds to a conversion of 94.5%.

The product obtained in accordance with experiment (b) is not only greater in quantity, but also is of superior quality, as compared with the product obtained in experiment (a). Furthermore, a lower ratio of acid is required and the processing time is considerably shortened when the promoter is employed.

Example 3.—A mixture of isobutyraldehyde and hydrogen cyanide, having 10% molar excess of hydrogen cyanide, is processed at 50° C. under atmospheric pressure in the presence of a pyridine catalyst (1% by weight based on the aldehyde). The reaction is rapid and essentially quantitative, the cyanhydrin produced being of high quality. The isobutyraldehyde cyanhydrin thus obtained is processed with an excess of ammonia (mol ratio of cyanhydrin to ammonia, 1:15) at a temperature of 120° to 125° C. under 120 atmospheres pressure, for 15 minutes. Conversion of the cyanhydrin to alpha-aminoisobutyronitrile is 97%. After removal of ammonia, this crude aminonitrile is hydrolyzed by treatment with boiling 50% sulfuric acid. (2 mols per mol of nitrile) containing 0.1% HgO (based on the weight of the 50% acid) for 2½ hours. Upon neutralization of the excess acid with ammonium hydroxide, and removal of water by evaporation at diminished pressure there remains a dry residue, containing ammonium sulfate and dl-valine. This residue is extracted with liquid ammonia, and crude dl-valine is obtained by evaporation of ammonia from the extract. This is decolorized by means of charcoal. The dl-valine is purified by recrystallization from water (yield 69%).

Example 4.—A mixture of alpha-methyl-butyraldehyde and hydrogen cyanide (10% excess), containing 1% pyridine, is maintained at a temperature of about 50° for about 1 hour. The resulting mixture is made acidic with sulfuric acid and the excess hydrogen cyanide is removed at reduced pressure. This leaves a residue of alpha-methyl-butyraldehyde cyanhydrin, corresponding to 98% yield based on the alpha-methyl-butyraldehyde charged. This cyanhydrin containing the pyridine catalyst is processed with 20 molal proportions of ammonia at 100° C. under an autogenously developed pressure of 800 pounds per square inch for 30 minutes. The resulting product is removed from the reactor, and upon evaporation of the ammonia it yields a residue which corresponds to 87.4% yield of isoleucine nitrile. A mixture of the crude isoleucine nitrile and 3 equivalents of constant boiling (20.2%) hydrochloric acid is refluxed for 4 hours, during which time a slow stream of dry hydrogen chloride is passed through the flask to maintain the hydrochloric acid concentration approximately constant. The resulting product is then made slightly basic with ammonium hydroxide. After filtering the mixture, evaporating the solvent, and washing the ammonium chloride-containing residue with 58% aqueous methanol, a solution is obtained which upon evaporation yields isoleucine (yield in the hydrolysis step, 75%).

*Example 5.*—Liquid hydrogen cyanide (100 c. c., corresponding to 10% excess) is added portion-wise to a stirred charge of 221.5 grams of isovaleraldehyde and 2.5 cc. of pyridine. The reaction temperature is maintained at 25° to 60° C. for 1 hour, after which time the pyridine catalyst is neutralized by adding 2.6 c. c. of 85% orthophosphoric acid. The excess hydrogen cyanide is then removed by evaporation at 25° C. under a pressure of 15 m. m. A substantially quantitative yield of isovaleraldehyde cyanhydrin is thus obtained. A mixture consisting of 33.9 grams of this cyanhydrin and 102 grams of ammonia (molar ratio of about 1:20) is processed in an agitated silver-lined bomb for 15 minutes at 110° C. to 114° C. under autogeneous pressure of 1075 to 1210 pounds per square inch. The bomb is thereafter cooled and the liquid product is discharged. Ammonia and much of the water of reaction are removed by evaporation at 25° C. under a pressure of about 15 mm. The resulting residue is almost entirely 2-aminoisocapronitrile. A mixture containing 19.3 grams of this 2-aminoisocapronitrile and 75 grams of constant boiling hydrochloric acid is heated at the boiling point for 3 hours. The resulting mixture is cooled and thereafter made slightly alkaline with ammonium hydroxide, whereupon a copious precipitate is obtained. This precipitate is removed by filtration, after which it is washed with 50% aqueous methanol to remove ammonium chloride. The resulting product is dl-leucine which is obtained in 74% yield based upon the isovaleraldehyde initially employed.

*Example 6.*—Methyl 4-oxobutyrate,

(116 grams) containing 0.1% by weight of pyridine as catalyst is mixed with liquid hydrogen cyanide (54 grams), which is introduced gradually at a temperature of 40° to 50° C. over a period of 20 to 30 minutes. External cooling is required to prevent the temperature from rising above 50° C. After the exothermic reaction has ceased, the mixture is cooled to about 5° C., and is held at that temperature for about 0.5 to 1.0 hour. The mixture is then made slightly acid with 85% orthophosphoric acid, and the excess hydrogen cyanide is removed by evaporation under diminished pressure. A residue of methyl 4-cyano-4-hydroxybutyrate corresponding to 97%—98% yield, based upon the weight of methyl 4-oxobutyrate initially charged, is obtained. This product is contaminated with the pyridine-phosphoric acid salt and with a small quantity of free hydrogen cyanide.

(a) A portion of the above product (30 grams) without purification, is heated under a pressure of about 40 to 60 atmospheres in a silver-lined shaker tube with 120 grams of ammonia (molar ratio of ammonia to cyanhydrin=34) at 60° for 1 hour. The product is thereafter withdrawn from the shaker tube and the excess ammonia is removed under diminished pressure, whereby a residue containing an alpha-aminonitrile is produced. A suspension of this amination product in 50 c. c. of cold water is prepared, and is mixed with 64 grams of cold concentrated hydrochloric acid. After the initial exothermic reaction has ceased (0.5 to 1.0 hour), the mixture is refluxed and stirred vigorously for four hours. Upon cooling the resulting reaction mixture a crystalline precipitate is formed. This is removed by filtration, after which additional crystals are obtained by concentrating the filtrate. This crystalline product is a mixture of glutamic acid hydrochloride and ammonium chloride. Pure glutamic acid hydrochloride is obtained by fractional crystallization of the product from aqueous hydrochloric acid (yield 82%, based upon the weight of methyl 4-oxobutyrate initially employed).

(b) An amination product (30 grams), prepared as described in Example 6(a) is suspended in 50 c. c. of water, and is added rapidly (5 to 6 minutes) to a boiling, vigorously stirred, solution containing 16.3 grams of sodium hydroxide in 32 c. c. of water, and the mixture is refluxed for an additional 30 minutes. The resulting product is concentrated to dryness under reduced pressure, whereby a white crystalline residue is obtained. This residue is washed several times with methanol and thereafter dried in an oven at 120° C. The product thus obtained is disodium glutamate,

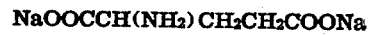

which is obtained in 80% yield based upon the weight of methyl 4-oxo-butyrate initially employed.

*Example 7.*—Aminoacetonitrile (28 grams), prepared in accordance with Example 1, is added to about 3 times its weight of water, and the resulting mixture is introduced dropwise into a boiling solution of 22 grams NaOH in 100 c. c. of water with vigorous stirring. The boiling is continued for 45 minutes to expel ammonia. Sulfuric acid is then added until a pH of 3 is reached, after which the pH is brought to 8 with ammonia. The resulting mixture is decolorized with charcoal. It is then filtered, and the filtrate is evaporated to dryness. Extraction of the dry residue with anhydrous ammonia, followed by evaporation of ammonia from the extract gives 31.8 grams of aminoacetic acid (conversion, 93.8%, based on aminoacetonitrile).

In the foregoing examples reference is made to an improved method for separating amino acids from the hydrolysis mixtures by adjusting the pH of the crude hydrolyzate of this invention to about 8 with an alkaline reagent, evaporating the mixture and extracting the amino acid from the resultant residue by means of liquid ammonia. In this way a good separation of amino acid from the inorganic constituents is achieved. This method is particularly effective when the operations are conducted so as to yield a mixture containing inorganic sulfate, especially sodium sulfate, as when the alkaline agent employed in the hydrolysis, or neutralization of acidic hydrolysis mixture, is sodium hydroxide, and the acidic agent is sulfuric acid. Ammonium sulfate and sodium sulfate are both sufficiently insoluble in anhydrous ammonia, but sodium sulfate is less bulky than ammonium sulfate, and amino acids can be separated from sodium sulfate by extraction with a relatively smaller quantity of anhydrous liquid ammonia.

This invention is not limited to the illustrative examples given above, since many different embodiments will occur to those skilled in the art. When desired, the aminoacid may be isolated in the form of a salt, amide, or other simple derivative. In general, however, the process of this invention may be employed for the manufacture of pure dl-alpha-mono-aminocarboxylic acids, which are useful in the animal feed industry.

We claim:

In a process for the synthesis of aminoacetic acid by hydrolysis of aminoacetonitrile with aqueous sulfuric acid containing 30% to 50% by weight of $H_2SO_4$ based on the weight of water and $H_2SO_4$ present, the step which comprises carrying out the said hydrolysis in the presence of mercuric sulfate as a promoter for the said sulfuric acid.

WILLIAM F. GRESHAM.
CARL E. SCHWEITZER.

REFERENCES CITED

The following references are of record in the file of this patent:

UNITED STATES PATENTS

| Number | Name | Date |
|---|---|---|
| 2,071,282 | Gluud et al. | Feb. 16, 1937 |
| 2,188,340 | Dykstra | Jan. 30, 1940 |
| 2,364,538 | Kirk | Dec. 5, 1944 |

FOREIGN PATENTS

| Number | Country | Date |
|---|---|---|
| 436,692 | Great Britain | Oct. 16, 1935 |
| 653,099 | Germany | Nov. 15, 1937 |
| 655,563 | Germany | Jan. 18, 1938 |
| 659,771 | Germany | May 10, 1938 |